US012645792B1

(12) United States Patent
Moriarty et al.

(10) Patent No.: US 12,645,792 B1
(45) Date of Patent: Jun. 2, 2026

(54) BANKING DOCUMENT EXTRACTION AND ANALYSIS SYSTEM

(71) Applicant: Morgan Stanley Services Group Inc., New York, NY (US)

(72) Inventors: Russell A. Moriarty, Ellicott City, MD (US); Joseph T. Edmonds, Ellicott City, MD (US); Eric A. Mudge, Ellicott City, MD (US); Alec R. Kerr, Christiansburg, VA (US); Samuel J. Cook, Columbia, MD (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 19/279,721

(22) Filed: Jul. 24, 2025

(51) Int. Cl.
| | |
|---|---|
| *G06F 21/55* | (2013.01) |
| *G06Q 40/02* | (2023.01) |
| *G06V 30/19* | (2022.01) |
| *G06V 30/262* | (2022.01) |

(52) U.S. Cl.
CPC ......... G06F 21/554 (2013.01); G06Q 40/024 (2025.08); G06V 30/19 (2022.01); G06V 30/262 (2022.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,860,717 | B1 | 12/2020 | Edmonds | |
| 10,990,676 | B1 | 4/2021 | Edmonds et al. | |
| 11,184,379 | B1 * | 11/2021 | Kjar | H04L 63/1483 |
| 11,989,733 | B2 * | 5/2024 | Nascimento | G06Q 20/0425 |
| 12,271,757 | B1 | 4/2025 | Kerr et al. | |
| 12,417,214 | B1 * | 9/2025 | Zhang | G06F 40/205 |
| 2018/0191754 | A1 | 7/2018 | Higbee et al. | |
| 2021/0021612 | A1 | 1/2021 | Higbee | |
| 2021/0273961 | A1 | 9/2021 | Humphrey et al. | |
| 2021/0326461 | A1 | 10/2021 | Paul et al. | |
| 2021/0360027 | A1 | 11/2021 | Boyer et al. | |
| 2022/0230142 | A1 * | 7/2022 | Batchu | G06N 20/00 |
| 2023/0300114 | A1 | 9/2023 | Bhallamudi et al. | |
| 2024/0275817 | A1 | 8/2024 | Grout et al. | |
| 2024/0291852 | A1 * | 8/2024 | Murphy | G06F 40/56 |
| 2025/0045763 | A1 | 2/2025 | Ben Nun et al. | |
| 2025/0131759 | A1 * | 4/2025 | Zhao | G06V 30/413 |
| 2025/0193213 | A1 * | 6/2025 | Gilliam | H04L 63/1425 |
| 2025/0225376 | A1 * | 7/2025 | Hu | G06N 20/00 |

* cited by examiner

*Primary Examiner* — Christopher C Harris

(74) *Attorney, Agent, or Firm* — HUNTON ANDREWS KURTH LLP

(57) ABSTRACT

An embodiment of the present invention is directed to an extraction and analysis system that comprises a network sensor configured to capture network traffic, a source document processor configured to extract text from source documents in the captured network traffic, an artificial intelligence (AI) inference engine configured to extract structured banking information from the extracted text, and an interface to a security information and event management (SIEM) system configured to receive the extracted structured banking information and generate alerts based on the extracted structured banking information. The system enables automated extraction and analysis of banking details from various document types within network traffic for enhanced security monitoring and threat detection.

18 Claims, 6 Drawing Sheets

BANKING DOCUMENT EXTRACTION AND ANALYSIS SYSTEM

FIELD OF THE INVENTION

The present invention relates generally to cybersecurity systems for analyzing financial transactions and more specifically to an AI-enabled system for extracting and analyzing banking details from various document types to detect potentially fraudulent transactions.

BACKGROUND

In recent years, digital communication has become increasingly prevalent in financial transactions. Banking institutions, businesses, and individuals now routinely exchange sensitive financial information through various electronic channels, including email, document sharing platforms, and other digital mediums. This shift has brought about significant conveniences but has also introduced new challenges in maintaining the security and integrity of financial data.

The diversity of formats used to transmit financial information presents a complex landscape for cybersecurity systems. Transaction details may be embedded within emails, attached as PDF documents, included in spreadsheets, or even contained within images. This variability makes it difficult for traditional security measures to consistently identify and extract relevant financial data across various formats.

As digital financial communications have grown, so too have the sophistication and frequency of cyber threats targeting these exchanges. Malicious actors continually develop new mechanisms to intercept, alter as well as fabricate financial communications, potentially leading to unauthorized transactions or other fraudulent activities. The ability to quickly and accurately detect anomalies or suspicious patterns within financial communications has become increasingly important for organizations seeking to protect their assets and those of their clients.

Existing cybersecurity systems often struggle to keep pace with the evolving nature of these threats. Many rely on predefined rules or pattern matching techniques that fail to adequately capture the nuances of modern financial communications or the tactics employed by sophisticated threat actors. Additionally, the sheer volume of digital financial transactions occurring daily presents challenges in terms of processing power and analysis speed for many current security solutions.

Furthermore, the global nature of modern finance introduces additional complexities. Different regions may use varying formats for financial data, such as account numbers, routing codes, or beneficiary information. This diversity further complicates the task of accurately extracting and analyzing financial details from communications originating from or directed to various parts of the world.

Accordingly, there is a need for an improved system and method for extracting and analyzing banking details from various document types to detect potentially fraudulent transactions.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Systems and methods for implementing a banking document extraction and analysis system are provided. The innovative system and method is directed to a configurable AI-enabled pipeline that extracts and analyzes financial transaction information being carried by a particular protocol (e.g., HTTP, SMTP, SMB, FTP, etc.) or embedded in a file being transmitted by such protocol.

According to an embodiment, a computer-implemented system comprises: at least one network sensor configured to capture network traffic; a source document processor configured to extract data from a plurality of source documents in multiple disparate formats from the captured network traffic wherein the captured network traffic identifies a protocol session from each of the plurality of source documents; an artificial intelligence (AI) inference engine configured to generate structured banking information in a predetermined format from the extracted data from the plurality of source documents; an interface configured to communicate with one or more of: a security information and event management (SIEM) system configured to receive the extracted structured banking information and generate alerts based on the extracted structured banking information; an indicator of compromise (IOC) engine configured to generate alerts based on the extracted structured banking information matching known malicious banking details; or a regression testing processor configured to support one or more AI model, configuration or prompt change; and a database that stores the structured banking information with corresponding cybersecurity observables to enable one or more of: queries, aggregations, or analysis of historical data.

According to another embodiment, a computer-implemented method comprises the steps of: capturing network traffic using at least one network sensor; extracting, via a source document processor, data from a plurality of source documents in the captured network traffic in multiple disparate formats from the captured network traffic wherein the captured network traffic identifies a protocol session from each of the plurality of source documents; generating, via an artificial intelligence (AI) inference engine, structured banking information in a predetermined format from the extracted data from the plurality of source documents; providing the extracted structured banking information to a security information and event management (SIEM) system; communicating, via an interface, with one or more of: a security information and event management (SIEM) system configured to receive the extracted structured banking information and generate alerts based on the extracted structured banking information; an indicator of compromise (IOC) engine configured to generate alerts based on the extracted structured banking information matching known malicious banking details; or a regression testing processor configured to support one or more AI model, configuration or prompt change; and storing, in a database, the structured banking information with corresponding cybersecurity observables to enable one or more of: queries, aggregations, or analysis of historical data.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
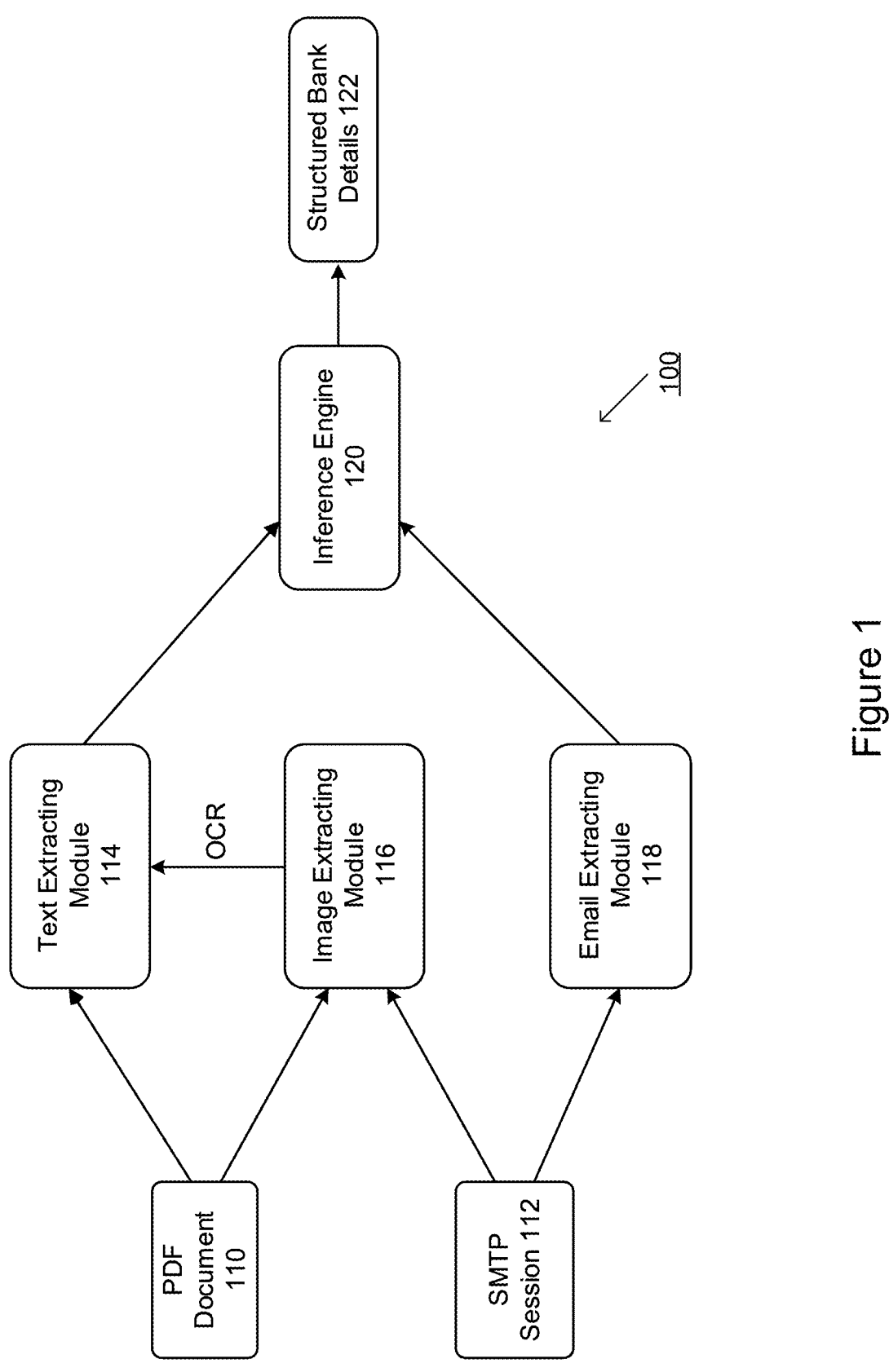
FIG. 1 is an exemplary system diagram of a document processing and analysis process, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to a banking document extraction and analysis system that provides an advanced cybersecurity solution for detecting potentially fraudulent financial transactions. This system may leverage artificial intelligence (AI) and machine learning (ML) techniques to extract and analyze banking details from a wide variety of document types encountered in network traffic from a range of sources.

According to an embodiment of the present invention, the system may include sensors for capturing relevant network traffic, a source document processing module for extracting text from various file formats, and an AI-powered inference engine for deriving structured banking information from the extracted text. The extracted information may then be provided to a security information and event management (SIEM) system, other cyber detection alerting systems and/ or databases for further analysis and alert generation.

The system may process multiple document formats, including email messages, PDF attachments, and image files in various formats (e.g., PNG, JPG, etc.). Other inputs may be supported including voice, text messages, multi-media content and other forms of communications. In some implementations, optical character recognition (OCR) technology may be employed to extract text from images, expanding the system's ability to analyze diverse data sources. An AI inference engine may consider contextual information about the source documents to improve the accuracy of its extractions and enhance downstream analytics.

To enhance its analytical capabilities, an embodiment of the present invention may incorporate various data storage and processing components. These may include a graph database for storing extracted banking information alongside cybersecurity observables, enabling complex relationship analysis. A key-value database may be used to store summarized observables (e.g., email addresses, IP addresses, domain names, file hashes, registry key values, network traffic, bank name, bank address, account name, account address, account number IBAN, routing number, SWIFT code, phone number, etc.), facilitating quick access to important metadata such as first-seen and last-seen timestamps for specific banking details as well as large scale data science experiments, visualizations, clustering, trend analysis (e.g., analysis of historical or previously seen data), and/or various actions (e.g., queries, aggregations, data analytics, etc.). For example, after a case with bank details has been confirmed as malicious, other potentially malicious cases may be identified by pivoting on bank artifacts within the confirmed malicious case.

The system may also include an indicator of compromise (IOC) engine that generates alerts based on matches between extracted banking information and known malicious patterns. This component may work in conjunction with a SIEM system and/or other cyber detection or alerting systems to provide comprehensive threat detection and alerting capabilities.

In some implementations, an embodiment of the present invention may incorporate features for continuous improvement and quality assurance. These may include functionality for analysts to review and edit extracted information, as well as regression testing to ensure consistent performance across system updates and improvements. The system may automatically incorporate analyst-confirmed extractions for new test cases, allowing it to adapt and improve over time.

By combining these various components and capabilities, the banking document extraction and analysis system may provide a powerful tool for organizations seeking to protect against evolving financial cybersecurity threats in an increasingly digital transaction landscape.

As the landscape of digital financial communications continues to evolve, an embodiment of the present invention provides an advanced, flexible, and comprehensive approach to extracting and analyzing banking details from diverse document types. Such approaches are capable of adapting to new formats, detecting subtle indicators of potential fraud, and providing actionable insights to security teams in a timely manner.

FIG. 1 is an exemplary system diagram of a document processing and analysis process, according to an embodiment of the present invention. An embodiment of the present invention is directed to processing various types of input documents to extract structured banking information for security analysis.

As shown in FIG. 1, system 100 may receive inputs in various formats from a wide range of sources. Inputs may include a PDF Document 110. System 100 may include various processing components, including Text Extracting Module 114 that processes text content from PDF Document 110. Image Extracting Module 116 may process images or other non-text content from PDF Document 110.

System 100 may also identify an SMTP (Simple Mail Transfer Protocol) session 112 as an input. Image Extracting Module 116 may process images from SMTP Session 112. An Email Extracting Module 118 may process text content from SMTP Session 112.

The Extracting Modules, shown by 114, 116 and 118, may support various integrations, applications, architectures and layouts. While a single illustrative module or component is shown, these illustrative modules or components may be replicated, multiplied, combined or consolidated for different environments and architectures. In addition, the Extracting Modules may support AI/ML models, LLMs and/or other extraction features.

An embodiment of the present invention may utilize a file analysis and malware detection system to extract text and images embedded within documents attached to a SMTP message. Additional details relating to the file analysis and malware detection system may be found in U.S. Pat. No. 10,860,717, entitled "Distributed System for File Analysis and Malware Detection," the contents of which are incorporated by reference herein in their entirety.

As shown in FIG. 1, Text Extracting Module 114 may connect to an Inference Engine 120. System 100 may support OCR processing between Image Extracting Module 116 and Text Extracting Module 114. This allows text to be extracted from an image content before being processed by Inference Engine 120. Email Extracting Module 118 may also connect to Inference Engine 120.

If a source document is textual (e.g., an email message, etc.), it may be passed to Inference Engine 120 configured to support structured outputs, along with contextual information about the source document (e.g., "The following is an email message . . . ") and a JSON schema specifying the expected format of the returned banking details. Other output formats may be supported. Contextual information may include details relating to the source document, type of source document, properties, metadata, etc.

If the source document is not textual (e.g., an image, PDF document, etc.), it may be passed through one or more processors to extract text prior to sending the text to Inference Engine 120. Some of these processors may use an AI inference engine as part of the implementation (e.g., OCR).

With an embodiment of the present invention, a source document may go through multiple rounds of processing before the text is sent to Inference Engine 120. For example, a PDF document may be extracted from a SMTP session. In this example, an image may be extracted from the PDF document and then an OCR process may be applied to extract text before sending the extracted information to Inference Engine 120. Depending on the type of input and complexity of the document and/or data, multiple rounds of extracting and/or processing may be applied. Accordingly, an embodiment of the present invention may support many different types of inputs from a wide range of sources and inputs.

In some cases, System 100 may maintain a transcript of the processing rounds for source documents. This transcript may include information about the various extraction and processing steps performed on each input document. The transcript may also capture context specific prompts, data (observables) relationships, etc. The transcript may be sent as additional context to Inference Engine 120. Other contextual and supporting information may be obtained and provided.

Inference Engine 120 may be configured to generate structured outputs. Using AI models, LLMs and/or other AI tools, Inference Engine 120 processes the extracted content to generate Structured Bank Details 122. For example, Structured Bank Details 122 may represent structured banking information in a predetermined format from the various input sources.

Figure 2:
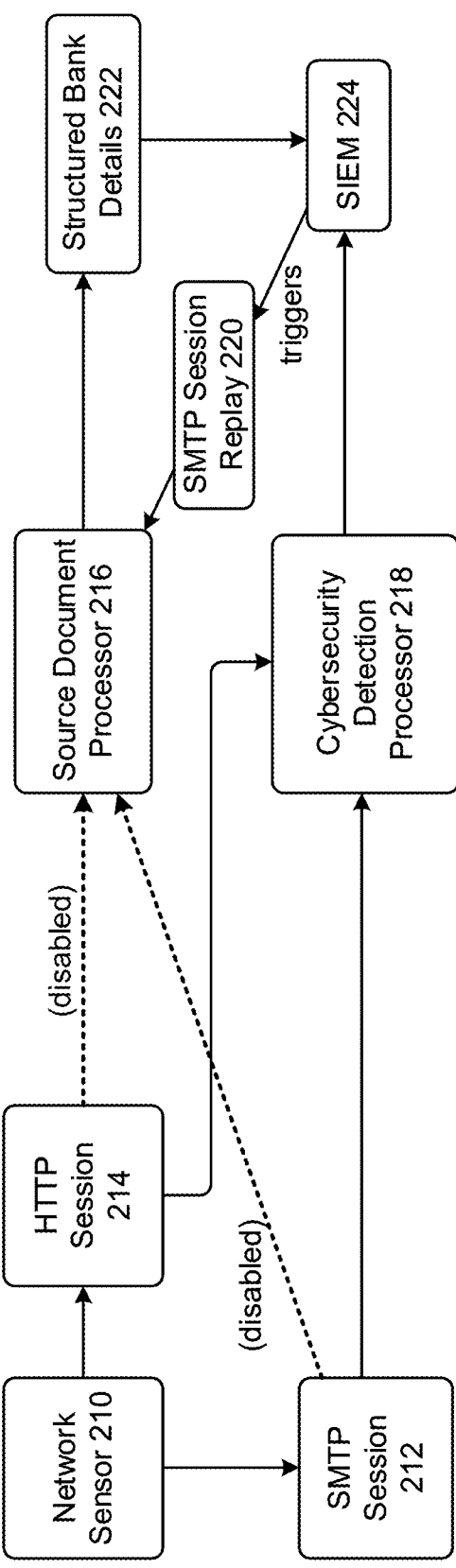
FIG. 2 is an exemplary illustration of an ingest pipeline configuration, according to an embodiment of the present invention.

FIG. 2 is an exemplary illustration of an ingest pipeline configuration, according to an embodiment of the present invention.

An embodiment of the present invention is directed to a configurable AI-enabled pipeline that extracts and analyzes financial transaction information being carried by a particular protocol or embedded in a file being transmitted by such protocol. Various protocols and file/document types may be supported.

As shown in FIG. 2, a Network Sensor 210 may capture network traffic and extract session data for protocols such as HTTP (as shown by 214) and SMTP (as shown by 212). In this example, HTTP Session 214 and SMTP Session 212 may communicate with a Source Document Processor 216 where the communication links may be individually configured. One or more protocol sessions to Source Document Processor 216 (which may be integrated with Inference Engine) may be conditionally processed. For example, a raw session may be potentially processed based on criteria which may include promotion criteria where data may be promoted to a deeper level of processing based on initial conditions.

Sensors, as shown by Network Sensor 210, may be deployed throughout a network to extract network data, metadata, session data, files, etc. from different protocols, e.g., HTTP (HyperText Transfer Protocol), SMTP (Mail Transfer Protocol), SMB (Server Message Block), FTP (File Transfer Protocol), etc. Files may include documents, PDF documents, spreadsheets, email messages, voice files, audio, video, multimedia, etc. While a single sensor is shown for illustration purposes, multiple sensors of varying forms and types may be implemented across various systems, platforms, environments, entities, etc.

For example, Network Sensor 210 may capture and store the protocol session in a format such as PCAP, from which an agent may derive transmitted files and other session data (e.g., email messages). Additional details relating to the network sensor may be found in U.S. Pat. No. 10,990,676, entitled "File Collection Method for Subsequent Malware Detection," the contents of which are incorporated by reference herein in their entirety. Packet Capture (PCAP) may represent a file format for saving network traffic data and capturing a snapshot of network packets allowing for detailed analysis of network communication.

According to an embodiment of the present invention, the AI-enabled (ingest) pipeline may be configurable so that various document sources may be enabled or disabled based on certain considerations, such as the needs of the user/entity/environment, computing resources (e.g., power of the hardware running the system, etc.), etc. For example, email attachments of a specific type (e.g., PDF) may be enabled, while other file types and email message body itself may be disabled. The configurations may be user identified as well as automatically applied based on a set of predetermined conditions, AI/ML based determinations, and/or other considerations.

The needs of the user/entity/environment may refer to how an enterprise is transferring documents, files, data, etc. For example, the enterprise may host a network share that is used to transfer documents. In this case, the extraction process may be specific to SMB captures so that the enterprise may incorporate sensors to collect SMB traffic for file extraction. Other extractions and business processes may be considered for customization and configuration. This configurability may allow for selective processing of different types of network traffic and documents and may further support flexibility in the system's operation and types of information being received and processed in a resource efficient manner.

Source triggers may be used to further refine the AI-enabled (ingest) pipeline. For example, a source trigger may indicate an observation of a source document within a specific context. In this example, a network sensor trigger may indicate a source document is observed on a network sensor, whereas a SIEM trigger may indicate a source document is observed as part of a SIEM case. The SIEM case may indicate involvement in a cybersecurity alert. As a result, an embodiment of the present invention may disable (or allow the user to disable) tasking for the network sensor trigger and instead task all file types and the email message body itself for a SIEM trigger. In this configuration, the system may ingest banking details from source documents involved in a cybersecurity alert. Other triggers to address various applications and scenarios may be supported.

An embodiment of the present invention may support various triggers and conditions from other cybersecurity systems.

HTTP Session 214 and SMTP Session 212 may also communicate with a Cybersecurity Detection Processor 218 that detects cybersecurity events and generates new alerts that may be fed into a SIEM system, shown by 224, that manages various SIEM cases that may be analyzed and triaged by analysts.

An SMTP Session Replay 220 component may interface with Source Document Processor 216 that generates Structured Bank Details 222. Structured Bank Details 222 may be communicated to SIEM 224 and associated with the given case to facilitate analyst triage, escalation to external organizations and/or incident response.

In some cases, SIEM 224 may trigger SMTP Session Replay 220, allowing for security monitoring and analysis. The system's components may work together to process network traffic, analyze documents, detect security issues, and manage cases through a SIEM system.

In this example, SIEM 224 may capture cybersecurity alerts and generate alerts. As shown in FIG. 2, an embodiment of the present invention may take observables related to the alerts and replay them through the system, as shown by SMTP Session Replay 220. For a SMTP session, the text body may be extracted along with attachments and then sent to an Inference Engine. The extraction process may support various extraction methods including a file analysis and malware detection system to identify observables which may be provided to the SIEM system. Additional details relating to a distributed system for file analysis and malware detection may be found in U.S. Pat. No. 10,990,676, entitled "File Collection Method for Subsequent Malware Detection," the contents of which are incorporated by reference herein in their entirety. Accordingly, an embodiment of the present invention may analyze cases that have already generated alerts through a SIEM or other analytics and may be further used to generate new analytics based on details from the extraction process.

Source Document Processor 216 may work with or be integrated in an Inference Engine to generate Structured Bank Details 222.

According to an embodiment of the present invention, Structured Bank Details 222 may include a JSON list of bank details extracted from a source document, which may be parsed to generate observables and then added to SIEM 224. This enables similar case linking and facilitates triage by an analyst or other user. If the analyst determines it is likely a fraudulent transaction, such as Business Email Compromise (BEC)-enabled fraud, the case may be escalated to a response organization via the SIEM's structured case escalation capability. Business Email Compromise (BEC) represents a type of cybercrime where an attacker uses email to impersonate a trusted business contact, such as an executive, vendor, or employee, to deceive individuals within an organization into transferring money or revealing sensitive information. The extracted banking details may be included as part of the case observables and analyst notes sent to responders who may take immediate action based on the information.

An embodiment of the present invention may support integrations with various systems including a SIEM that stores references to source documents relating to a cyber-security alert. Additional details relating to the SIEM may be found in U.S. Pat. No. 12,271,757, entitled "Security Incident and Event Management Case Creation System and Method," the contents of which are incorporated by reference herein in their entirety.

For example, an analyst may perform a triage of a SIEM case in the SIEM system and determined a true positive that may be escalated to a response group to conduct an investigation. Accordingly, observables from the case may be sent to the response group within an external organization. With the banking details, the response group may be better positioned to address the escalation.

According to another example, during a triage process, an analyst may review cases and supporting documents as well as observables that were extracted and have been added as a SIEM case. This may support a quality assurance process on the observables to correct potential errors.

According to another example, an embodiment of the present invention may support a post-escalation process. If a SIEM case is determined to be a true positive, an associated observable in bank details that is determined to be sufficiently unique may then be tasked to an IOC Engine. An embodiment of the present invention may recognize that bad actors may reuse stolen identities. For example, when a bad actor uses a unique beneficiary name on wire instructions, an embodiment of the present invention may recognize that as an observable. In the post-escalation process, after a case has been verified as a true positive, an analyst may identify a unique artifact and task this to an IOC engine to generate a new SIEM case or new alert.

In addition to recording the details to the SIEM as case observables, these details may be routed to other systems based on configuration settings and/or other determinations. Other receiving systems may include: a Graph Database, a Key-Value Database, Elasticsearch Index, and an onsite IOC Engine. Each output location may enable a different type of workflow.

According to an embodiment of the present invention, a Summarization Module may record summarized bank detail observation data in a Key-Value Database, such as first-seen/last-seen timestamps, observation counts by field, and references to source document in which the field value was first observed.

Another embodiment of the present invention may store bank details in a Graph Database alongside SMTP details and file analysis results that facilitate clustering and finding relationships between different transaction events and uncovering related bank activity that may be fraudulent. It also enables new detection analytics such as alerting on an established client email address sending in a payment request with a new bank name.

Figure 3:
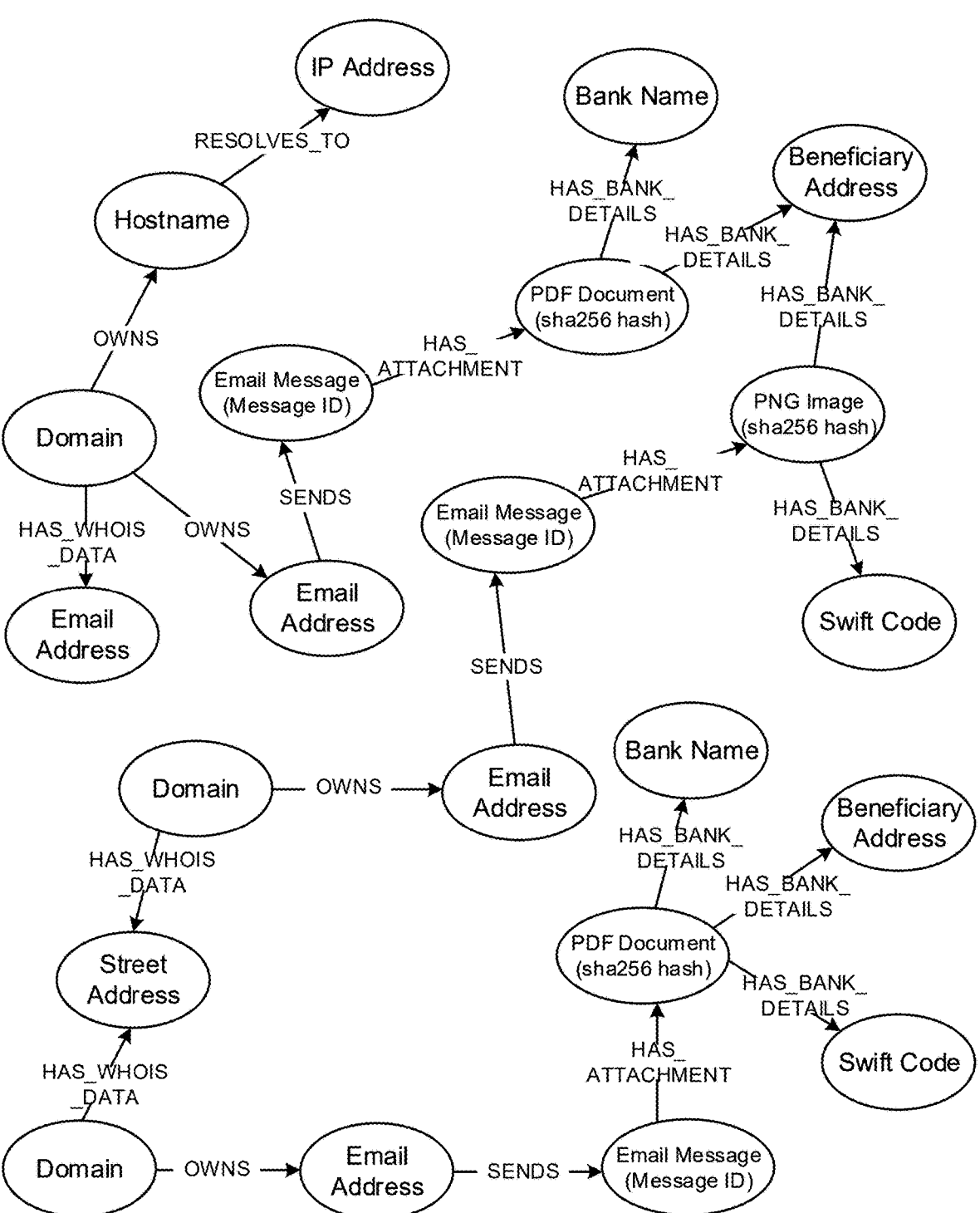
FIG. 3 is an exemplary illustration of a graph database schema, according to an embodiment of the present invention.

FIG. 3 is an exemplary illustration of a graph database schema, according to an embodiment of the present invention. FIG. 3 illustrates a network diagram showing relationships between various data elements and processing components in a banking document analysis system. The diagram depicts interconnections between domains, email addresses, and document processing elements.

An embodiment of the present invention is directed to combining structured bank details (e.g., banking instructions) with cyber observables (e.g., domain names, email addresses, etc.) to develop new analytics to pivot through both types of data and improve clustering of threat actor activity which may then be used to trigger new source documents through the system. Additional details relating to a fraudulent digital document pivoting engine may be found in U.S. patent Ser. No. 12,301,622, entitled "SYSTEM FOR CYBERSECURITY CAMPAIGN ARTIFACT DISCOVERY AND TASKING", issued May 13, 2025, the contents of which are incorporated by reference herein in their entirety.

Email addresses may send email messages with attachments including PDF documents and PNG images. These documents may contain bank details including bank names, beneficiary addresses, SWIFT codes, etc.

The documents may be connected through relationships such as "HAS_BANK_DETAILS" relationship, allowing tracking of banking information across different document types. This network structure enables tracing of relationships between email communications, attached documents, extracted banking details and/or other attributes.

In some cases, the system may include a unified graph database schema for pivoting through both cyber and financial data simultaneously. This schema may allow for clustering and discovery of related fraud actor activity by connecting cyber observables with extracted banking details.

The connections between elements may allow for tracking document lineage and relationships between banking details across multiple sources. For example, an email address sending a PDF document containing specific bank details may be linked to other email addresses or domains associated with similar banking information.

In addition, a banking document analysis system may use this network structure to analyze the flow of financial transaction data through various communication channels and document types. By mapping these relationships, the system may identify patterns and/or connections that may indicate potential fraudulent activity, security threats and/or other event or indicator.

In some cases, the system may use the graph database to perform queries that span both cyber and financial data. For example, the system may identify all email addresses associated with a particular bank account number, or find all documents containing banking details that were sent from a specific domain.

The network diagram may also facilitate the identification of clusters of related activity. For example, multiple email addresses sending documents with similar banking details may be grouped together, potentially indicating a coordinated fraudulent campaign.

By representing the data in this interconnected manner, the banking document analysis system may provide a comprehensive view of the relationships between cyber elements (such as domains, email addresses, etc.) and financial elements (such as bank details, transaction information, etc.). This integrated approach may enhance the system's ability to detect and analyze potential security threats or fraudulent activities related to banking transactions.

Figure 4:
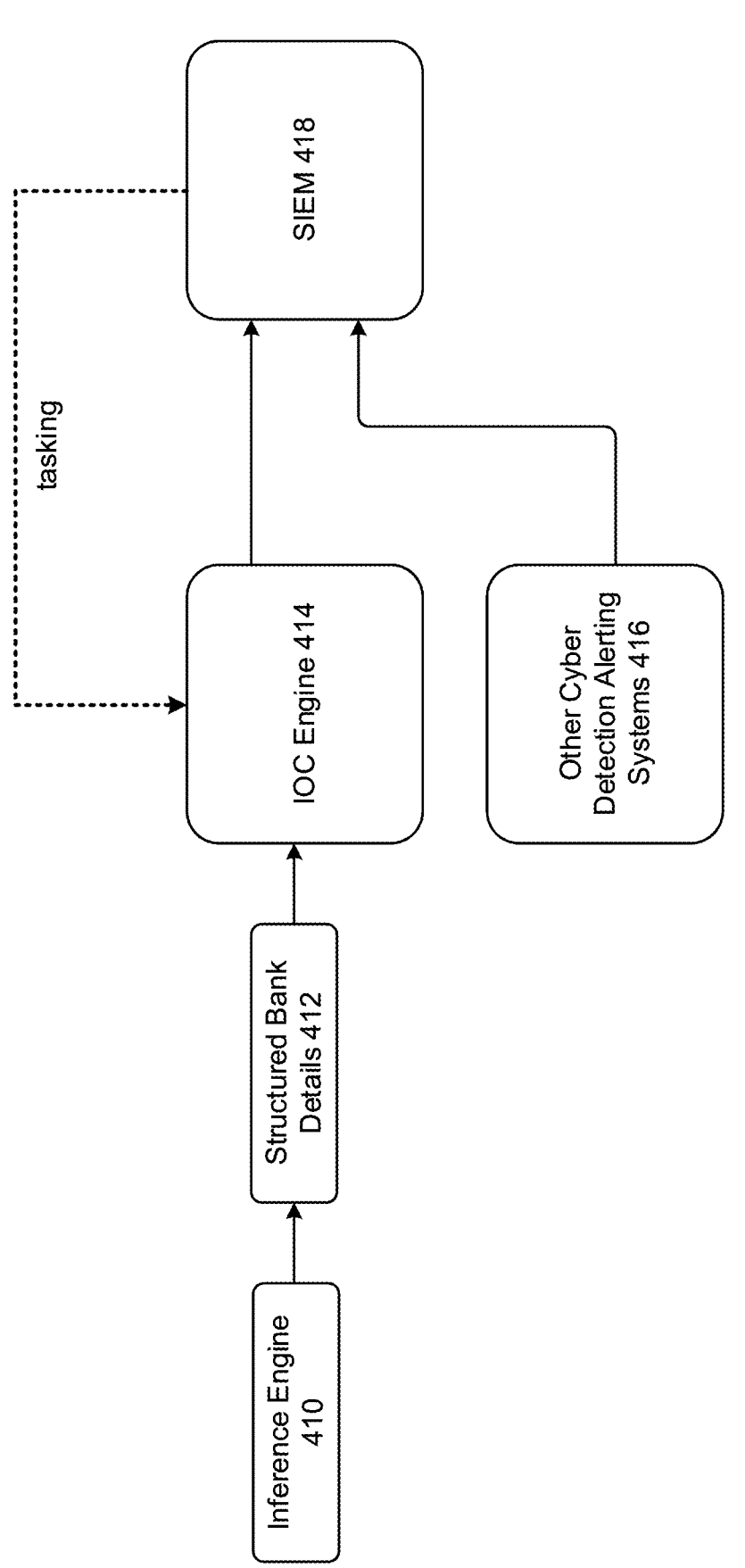
FIG. 4 is an exemplary illustration of an IOC engine feedback loop, according to an embodiment of the present invention.

FIG. 4 is an exemplary illustration of an IOC engine feedback loop, according to an embodiment of the present invention.

The system may include Inference Engine 410 that processes input data to extract banking information. In some cases, Inference Engine 410 may utilize components such as the text extractor, the image extractor, and/or the email body extractor to process different types of content from source documents. Inference Engine 410 may output Structured Bank Details 412 based on its analysis of the input data. Structured Bank Details 412 may contain extracted and structured banking information from various input sources in various formats.

In some cases, the system may include an IOC Engine 414 that receives Structured Bank Details 412 and performs indicator of compromise alerting. IOC Engine 414 may generate alerts that may be provided to a SIEM system, as shown by 418, and result in a SIEM case being created.

According to an embodiment of the present invention, bank details extracted from source documents may be routed through an on-site IOC detection engine, represented by IOC Engine 414, which may be tasked with known bad observables extracted from prior cases as well as discovered by pivoting on the graph database. As shown by FIG. 4, this creates a feedback loop where true positive detections are fed back into detection tasking thereby enabling future detections. For example, when SIEM 418 confirms a true positive detection, this information may be used to update IOC Engine 414 and/or refine the analysis parameters of Inference Engine 410.

SIEM 418 may receive and process inputs from multiple sources including Structured Bank Details 412, IOC Engine 414, and the other cyber detection alerting systems 416. In some cases, SIEM 418 may provide tasking feedback to IOC Engine 414.

An embodiment of the present invention may also include other cyber detection alerting systems, represented by 416, that provide additional security alerts and analysis results to SIEM 418. These cyber detection alerting systems, represented by 416, may integrate with the banking document analysis components to provide a comprehensive security monitoring solution.

Figure 5:
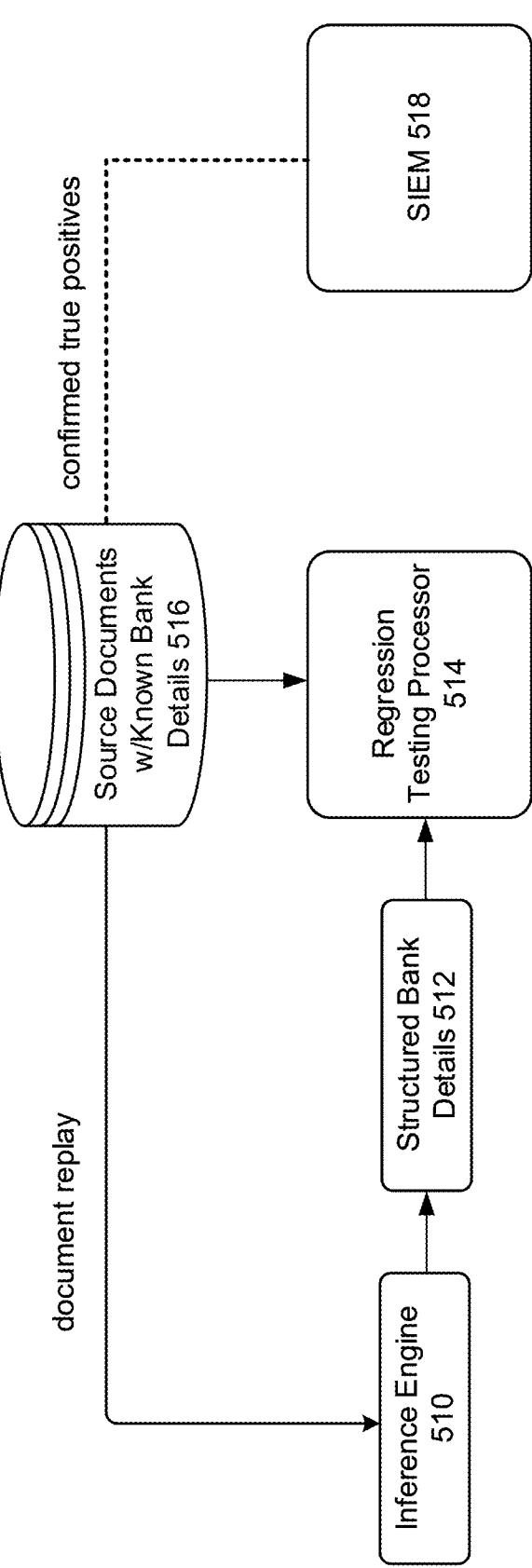
FIG. 5 is an exemplary illustration of a regression testing framework, according to an embodiment of the present invention.

FIG. 5 is an exemplary illustration of a regression testing framework, according to an embodiment of the present invention. FIG. 5 illustrates a framework for regression testing previously extracted banking details, and automatically adding to the corpus of test cases as extractions are have gone through quality assurance during an analyst triage via the SIEM. This framework facilitates regression testing when the AI model is changed or the prompt itself is updated to support new features and functionality.

An embodiment of the present invention recognizes that AI tools, models, prompts and supporting libraries evolving quickly and are improved upon continuously with new models and frequent updates. An embodiment of the present invention may integrate and update new features as new developments are released in a manner that does not introduce regressions into the system.

As banking artifacts associated with malicious transactions are identified during the triage and escalation process, these artifacts may be tasked in an IOC engine, which may then generate an alert if the artifact is observed in transaction details extracted via this pipeline in the future.

The system may include Inference Engine 510 that processes input data to extract banking information. In some cases, Inference Engine 510 may utilize components such as the text extractor, the image extractor, and/or the email body extractor to process different types of content from source documents. Inference Engine 510 may output Structured Bank Details 512 based on its analysis of the input data. Structured Bank Details 512 may contain extracted and structured banking information from various input sources in various formats.

In some cases, the system may include a Regression Testing Processor 514 that evaluates the accuracy of the extracted information. Regression Testing Processor 514 may receive input from a collection of Source Documents from a database or other storage component shown by 516 containing known bank details that may be used to verify the extraction results. While a single database component is shown for illustration purposes, Source Documents may be from various sources across multiple systems and locations.

Structured Bank Details 512 from Inference Engine 510 may be provided to a SIEM 518. SIEM 518 may analyze the extracted details and provide confirmed true positives back to the source documents shown by 516 for future regression testing.

In some cases, the system may enable document replay functionality, where documents may be reprocessed through Inference Engine 510 to generate Structured Bank Details 512. This functionality may allow for testing of updated models or configurations while maintaining consistency with previously validated results.

Figure 6:
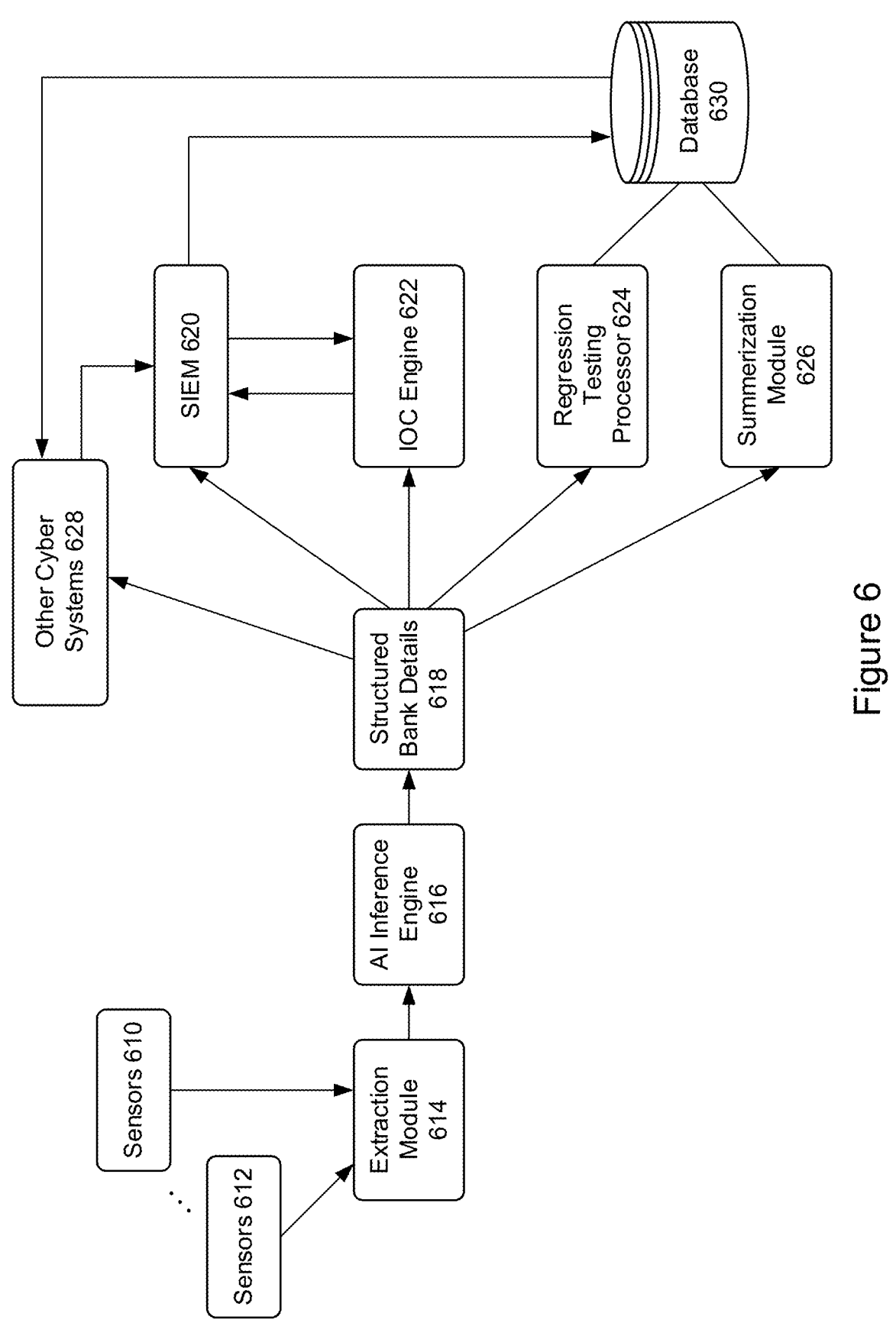
FIG. 6 is an exemplary system diagram, according to an embodiment of the present invention.

FIG. 6 is an exemplary system diagram, according to an embodiment of the present invention.

An embodiment of the present invention may account for different types of data (e.g., account number, routing number, IBAN, SWIFT code, etc.) and any number of possible ways this data may be present within unstructured text, image formats, document types, etc. The AI-enabled extraction pipeline embedded within an overall cybersecurity detection ecosystem enables structured observable extraction even when the format and layout of the banking details are not known in advance. This enables large-scale data analysis, fraud detection, and regression testing to handle evolving AI capabilities.

In some cases, the flow of data may move from initial capture at sensors, such as network sensors 610, 612, through various processing stages to ultimately generate SIEM cases for security analysis at SIEM 620. AI Inference Engine 616 may be integrated with a Source Document Processor that utilizes components such as the text extractor, image extractor, and email body extractor to process different types of content, as represented by Extraction Module 614. The processed content may then be sent to AI Inference Engine 616 to generate the structured bank details 618.

The extracted bank details may be routed to multiple systems for further analysis and storage. In some cases, these locations may include a graph database, a key-value database, an Elasticsearch index represented by Database 630. Other receiving systems may include SIEM 620, IOC Engine 622, Regression Testing Processor 624, Summarization Module 626, etc. Other Cyber Systems 628 may also be supported. This multi-faceted storage approach may allow for diverse analysis techniques and enable comprehensive threat detection capabilities.

According to an exemplary illustration, BEC actors may sometimes use the same bank account for multiple fraud attempts. A graph database with summarized observation data enables detection of the same account being used against multiple victims within a short period of time. In addition, an IOC engine integration, as shown by 622, detects the same threat actor using the same bank information targeting a different victim.

By integrating regression testing capabilities, through 624, and diverse data storage approaches, represented by 630, the document processing and analysis system may enhance its ability to accurately extract banking information, detect potential security threats, and maintain consistent performance across system updates and configuration changes.

In addition, bank details may be used in detection analysis that generate alerts, as shown by connections to Other Cyber Systems 628 from Structured Bank Details 618 and Database 630.

The graph database may store relationships between banking details and other cyber observables, facilitating complex queries and pattern recognition. Structured bank details may be stored in a graph database alongside SMTP details and file analysis results. This storage approach may facilitate clustering and relationship discovery between different transaction events and related bank activities. The graph database may enable complex queries that combine cyber observables with extracted banking details, potentially uncovering patterns or connections indicative of fraudulent activity.

The key-value database may provide quick access to specific banking details, while the Elasticsearch index may enable full-text search capabilities across the extracted information.

By routing the extracted bank details to multiple specialized storage and analysis systems, the banking document analysis system may enhance its ability to detect and respond to potential security threats related to financial transactions.

In some cases, the system may include a Summarization Module 626 that records summarized bank detail observation data in a key-value database. Summarization Module 626 may store information such as first-seen and last-seen timestamps, observation counts by field, and references to source documents in which field values were first observed. Summarization Module 626 may be integrated with Database 630.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in the Figures may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for implementing AI-enabled system for extracting and analyzing banking details from various document types to detect potentially fraudulent transactions and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system, comprising:

at least one network sensor configured to capture network traffic;

a source document processor configured to extract data from a plurality of source documents in multiple disparate formats from the captured network traffic wherein the captured network traffic identifies a protocol session from each of the plurality of source documents;

an artificial intelligence (AI) inference engine integrated with the source document processor and configured to generate structured banking information in a predetermined format from the extracted data from the plurality of source documents and the AI inference engine is configured to receive contextual information about a source document along with the extracted data when the source document is textual in type, and when the source document is not textual in type, the source document is processed to extract text prior to being passed to the AI inference engine;

an interface configured to communicate with one or more of: a security information and event management (SIEM) system configured to receive the extracted structured banking information and generate alerts based on the extracted structured banking information; an indicator of compromise (IOC) engine configured to generate alerts based on the extracted structured banking information matching known malicious banking details; or a regression testing processor configured to support one or more AI model, configuration or prompt change; and a database that stores the structured banking information with corresponding cybersecurity observables to enable one or more of: queries, aggregations, or analysis of historical data, wherein the database further stores message details and file analysis results to facilitate clustering and identify relationships between transaction events to allow for identification of patterns and connections indicative of fraudulent activity.

2. The computer-implemented system of claim 1, wherein the multiple disparate formats comprise a combination of: email messages, PDF documents, or image files.

3. The computer-implemented system of claim 1, further comprising an optical character recognition (OCR) processor configured to extract text from the plurality of source documents.

4. The computer-implemented system of claim 1, wherein the AI inference engine is configured to receive contextual information about the plurality of source documents along with the extracted data.

5. The computer-implemented system of claim 4, wherein the contextual information includes an indication of a source document type.

6. The computer-implemented system of claim 1, wherein the AI inference engine is configured to output the structured banking information in a JSON format.

7. The computer-implemented system of claim 1, wherein the database comprises a key-value database configured to store summarized observation data related to the extracted structured banking information.

8. The computer-implemented system of claim 1, wherein one or more protocol sessions to the AI inference engine is conditionally processed.

9. The computer-implemented system of claim 1, wherein the protocol session comprises at least one of: SMTP, HTTP, SMB or FTP and the data comprises at least one of: text, image or document.

10. A computer-implemented method, comprising the steps of:

capturing network traffic using at least one network sensor;

extracting, via a source document processor, data from a plurality of source documents in the captured network traffic in multiple disparate formats from the captured network traffic wherein the captured network traffic identifies a protocol session from each of the plurality of source documents;

generating, via an artificial intelligence (AI) inference engine integrated with the source document processor, structured banking information in a predetermined format from the extracted data from the plurality of source documents and wherein the AI inference engine receives contextual information about a source document along with the extracted data when the source document is textual in type, and when the source document is not textual in type, the source document is processed to extract text prior to being passed to the AI inference engine;

providing the extracted structured banking information to a security information and event management (STEM) system; and communicating, via an interface, with one or more of: the security information and event management (SIEM) system configured to generate alerts based on the extracted structured banking information; an indicator of compromise (IOC) engine configured to generate alerts based on the extracted structured banking information matching known malicious banking details; or a regression testing processor configured to support one or more AI model, configuration or prompt change; and storing, in a database, the structured banking information with corresponding cybersecurity observables to enable one or more of: queries, aggregations, or analysis of historical data, wherein the database stores message details and file analysis results to facilitate clustering and identify relationships between transaction events to allow for identification of patterns and connections indicative of fraudulent activity.

11. The computer-implemented method of claim 10, wherein the multiple disparate formats comprise a combination of: email messages, PDF documents, or image files.

12. The computer-implemented method of claim 10, wherein the source document processor comprises an optical character recognition (OCR) processor configured to extract text from the plurality of source documents.

13. The computer-implemented method of claim 10, wherein the AI inference engine is configured to receive contextual information about the plurality of source documents along with the extracted data.

14. The computer-implemented method of claim 13, wherein the contextual information includes an indication of a source document type.

15. The computer-implemented method of claim 10, wherein the AI inference engine is configured to output the structured banking information in a JSON format.

16. The computer-implemented method of claim 10, wherein the database comprises a key-value database configured to store summarized observation data related to the extracted structured banking information.

17. The computer-implemented method of claim 10, wherein one or more protocol sessions to the AI inference engine is conditionally processed.

18. The computer-implemented method of claim 10, wherein the protocol session comprises at least one of: SMTP, HTTP, SMB or FTP and the data comprises at least one of: text, image or document.

* * * * *